United States Patent [19]
Umio et al.

[11] 3,894,045
[45] July 8, 1975

[54] 1-ACYLOXY(LOWER) ALKYL-3-SUBSTITUTED PYRROLIDINE DERIVATIVES AND PROCESS FOR PREPARING SAME

[75] Inventors: Suminori Umio, Kawanishi; Hiroshi Nojima, Suita, both of Japan

[73] Assignee: Fujisawa Pharmaceutical Co., Ltd., Osaka, Japan

[22] Filed: Mar. 1, 1973

[21] Appl. No.: 336,942

[52] U.S. Cl. ....... 260/326.33; 260/326.34; 424/274
[51] Int. Cl. ...................... C07d 70/04; C07d 27/04
[58] Field of Search ................... 260/326.33, 326.34

[56] References Cited
OTHER PUBLICATIONS

Noller, Chemistry of Organic Compounds, (1965), pp. 183–184.
Umio et al., Chem. Abs., Vol. 77: 147449b, (1972).

*Primary Examiner*—Richard J. Gallagher

[57] ABSTRACT

Disclosed are certain 3-(10,11-dihydro-5H-dibenzo(a,d)cyclohepten-5-ylidene)-pyrrolidines and analogues thereof as well as processes for their preparation and their use as anti-tremorine agents.

9 Claims, No Drawings

1-ACYLOXY(LOWER) ALKYL-3-SUBSTITUTED PYRROLIDINE DERIVATIVES AND PROCESS FOR PREPARING SAME

This invention relates to 1-acyloxy(lower)-alkyl-3-substituted pyrrolidine derivatives and the process for preparing same. Particularly the invention pertains to 1-acyloxy(lower)alkyl-3-substituted pyrrolidine derivatives represented by the general formula

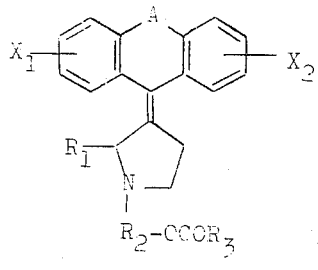

(I)

wherein A is an ethylene or oxygen linkage, $X_1$ and $X_2$ are individually hydrogen or halogen, $R_1$ is hydrogen or a lower alkyl group, $R_2$ is a lower alkylene group and $R_3$ is a lower alkyl or aryl group which may be substituted with one to three lower alkoxy groups, and acid addition salts thereof. The invention further pertains to a process for preparing the same.

In the specification and claims, the term "lower" means a 1 to 8 carbon chain in an alkyl, alkylene and alkoxy groups, "alkyl group" means a straight or branched alkyl chain such as methyl, ethyl, propyl, isopropyl, butyl, etc., "alkylene group" means a straight or branched alkylene chain such as methylene, ethylene, propylene, isopropylene, etc., "alkoxy group" means methoxy, ethoxy, propoxy, etc., "aryl group" means phenyl, tolyl, xylyl, etc., and "halogen" means fluorine, chlorine, bromine or iodine.

The 1-acyloxy(lower)alkyl-3-substituted pyrrolidine derivatives represented by the formula (I), which are all new compounds, have an antitremorine activity and are useful as an antiParkinson agent.

The compounds (I) described in the present invention can be prepared by reacting as 1-hydroxy-(lower)alkyl-3-substituted pyrrolidine derivative of the general formula

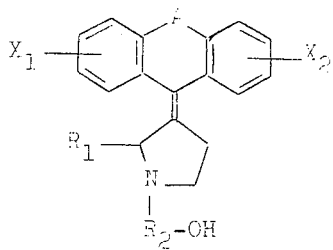

(II)

wherein A, $X_1$, $X_2$, $R_1$ and $R_2$ are individually the same as defined above, or the salt thereof with a carboxylic acid of the general formula $$R_3\text{—COOH}$$

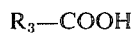 (III)

wherein $R_3$ is the same as defined above, or the reactive derivative at the carboxyl group thereof.

The salt of the starting compound (II) means an acid addition salt thereof with an inorganic acid such as hydrochloric acid, sulfuric acid, nitric acid, etc. or an organic acid such as maleic acid, tartaric acid, citric acid, picric acid, etc. Exemplars of the reactive derivative at the carboxyl group of the carboxylic acid (III) are an acid halides, acid anhydrides, amides, an azide and esters of the carboxylic acid (III), and the like. Examples of the said derivatives frequently used are acid halides such as acid chloride, acid bromide; acid azide; mixed anhydrides with dialkylphosphoric acid, dibenzylphosphoric acid, halogenophosphoric acid, dialkylphosphorous acid, sulfurous acid, thiosulfuric acid, sulfuric acid, alkylcarbonic acid, aliphatic carboxylic acid (e.g. pivalic acid, pentanoic acid, isopentanoic acid, 2-ethylbutanoic acid, etc.) or aromatic carboxylic acid (e.g. benzoic acid), or symmetrical type acid anhydride; acid amide with imidazole, 4-substituted imidazole, etc.; and esters such as methyl ester, ethyl ester, cyanomethyl ester, p-nitrophenyl ester, pentachlorophenyl ester, 2,4,5-trichlorophenyl ester, propargyl ester, carboxymethyl thioester, pyranyl ester, methoxymethyl ester, phenylthio ester or N-hydroxysuccinimide ester, etc.

In the present reaction, the carboxylic acid (III) may also be used in the form of salts thereof. The salts of the carboxylic acid (III) to be usd may include the salts with an alkali metal such as sodium, potassium, etc., an alkaline earth metal such as calcium, magnesium, etc. or with an organic base such as ammonia, an amine (e.g. dimethylamine, trimethylamine, etc.).

The present reaction is advantageously carried out in the presence of a condensing agent such as N,N'-dicyclohexylcarbodiimide, N-cyclohexyl-N'-morpholinoethylcarbodiimide, N-cyclohexyl-N'-(4-diethylaminocyclohexyl)carbodiimide, N,N'-diethylcarbodiimide, N,N'-diisopropylcarbodiimide, N-ethyl-N'-(3-dimethylaminopropyl)carbodiimide, N,N'-carbonyldi(2-methylimidazole), pentamethyleneketene-N-cyclohexylimine, diphenylketone-N-cyclohexylimine, alkoxyacetylene, 1-alkoxy-1-chloroethylene, 2-ethyl-7-hydroxybenzisoxazolium salt, and 2-ethyl-5-(m-sulfonyl)-isoxazolium hydroxide intramolecular salt.

The reaction of the present invention may be carried out either in or in the absence of a solvent. Exemplars of the solvent are ether, acetone, dioxane, acetonitrile, chloroform, ethylene chloride, tetrahydrofurane, ethyl acetate and pyridine, and any other conventional organic solvents, which do not take part in the reaction, are also usable.

The present reaction may also be effected in the presence of a base such as an alkali metal bicarbonate, trialkylamine, pyridine or the like. When the base or the aforesaid condensing agent is in the form of liquid, they may be used simultaneously as the solvent used in the present reaction. The reaction temperature is not particularly critical, and the reaction may be effected either with cooling or at room temperature or with heating. The reaction product is recovered and purified, according to conventional procedure, by extraction and isolation. The compound (I) may be converted, according to conventional procedure, into acid addition salts thereof with an inorganic acid such as hydrochloric acid, hydrobromic acid, hydroiodic acid, sulfuric acid, phosphoric acid, nitric acid, etc. or an organic acid such as acetic acid, propionic acid, succinic acid, oxalic acid, maleic acid, tartaric acid, fumaric acid, citric acid, etc.

The compounds (I) and its salts show an antitremorine activity, as shown with the following test.

Antitremorine Test in Mice

1. Test method: Male mice weighing 20 — 30 g were used in groups of 10 animals. Animals were subcutaneously injected with graded doses of the test compounds. Thirty minutes later, 10 mg/kg of tremorine was injected intraperitoneally, and then the presence or absence of tremor and salivation was observed macroscopically. The number of animals showing no tremor and/or salivation was recorded. This number served as the calculation of the $ED_{50}$ values on antitremor and antisalivation.

2. Test result:

| Test Compound | Antitremor ($ED_{50}$ : mg/kg) | |
|---|---|---|
| | Antitremor | Antisalivation |
| 1-(2-Acetoxyethyl)-2-methyl-3-(10, 11-dihydro-5H-dibenzo[a,d]cyclohepten-5-ylidene) pyrrolidine | 0.33 | 6.5 |

In practical administration for a therapeutical purpose, the salts of the compounds (I) is to be employed in a form of pharmaceutically acceptable acid addition salts.

The compounds (I) and their pharmaceutically acceptable salts can be administered by the conventional methods, the conventional types of unit dosages or with the conventional pharmaceutical carriers to produce a minor tranquilizing effect in human beings.

Thus, they can be used in the form of pharmaceutical preparation, which contain them in admixture with a pharmaceutical organic or inorganic carrier material suitable for enteral or parenteral applications. Oral administration by the use of tablets, capsules or in liquid form such as suspensions, solutions or emulsions is particularly advantageous.

Practical and presently-preferred embodiments of the present invention are illustrative shown in the following Examples.

Example 1

14.5 Grams of 3-(10,11-dihydro-5H-dibenzo[a,d]cyclohepten-5-ylidene)-2-methyl-1-pyrrolidineethanol is converted, according to usual procedure, into the corresponding hydrochloride. To the hydrochloride is added an excess of acetyl chloride, and the resulting mixture is heated under reflux for 2 hours. The liquid reaction mixture in distilled to remove an excess acetyl chloride, and the residue is washed with ether. The residue is further recrystallized from an ether-methanol mixture to obtain crystals of 1-(2-acetoxyethyl)-2-methyl-3-(10,11-dihydro-5-H-dibenzo[a,d]cyclohepten-5-ylidene)-pyrrolidine, m.p. 192°–193°C., in 80% yield.

| Elementary analysis: | for $C_{24}H_{27}NO_2$ | | |
|---|---|---|---|
| | C | H | N |
| Calculated (%): | 72.43 | 7.09 | 3.52 |
| Found (%) : | 71.96 | 6.88 | 3.34 |

Example 2

10.6 Grams of 3-(10,11-dihydro-5H-dibenzo[a,d]cyclohepten-5-ylidene)-2-methyl-1-pyrrolidineethanol is dissolved in 20 cc of chloroform. To the solution is added 15 g. of isobutyryl chloride, and the resulting mixture is heated under reflux for 19 hours. From the reaction liquid, the chloroform and isobutyryl chloride are removed by distillation under reduced pressure to obtain 15.7 g. of syrup as a residue. To the residue is added an aqueous sodium carbonate solution, and the resulting mixture is extracted with benzene. The benzene layer is washed with water and then treated with 10% hydrochloric acid. The solvent is distilled off from the benzene layer to obtain crystals of 1-(2-isobutyryloxyethyl)-2-methyl-3-(10,11-dihydro-5H-dibenzo[a,d]cyclohepten-5-ylidene)pyrrolidine hydrochloride, m.p. 117°–119°C., in 61% yield.

| Elementary analysis: for $C_{26}H_{32}NO_2Cl$ | | | |
|---|---|---|---|
| | C | H | N |
| Calculated (%): | 73.30 | 7.57 | 3.29 |
| Found (%) : | 73.04 | 7.47 | 3.26 |

Example 3

4.8 Grams of 3-(10,11-dihydro-5H-dibenzo[a,d]cyclohepten-5-ylidene)-2-methyl-1-pyrrolidineethanol is dissolved in 25 cc of anydrous benzene. To the solution is added a mixture comprising 7.0 g. of 3,4,5-trimethoxybenzoyl chloride 3.0 g. of triethylamine and 15 cc of dimethylformamide, and the resulting mixture is heated under reflux for 15 hours. From the reaction liquid, the benzene and triethylamine are distilled off under reduced pressure, and the residue is added with benzene and washed with water and dried. The benzene is distilled off. The oily residue is subjected to alumina column chromatography and developed with benzene. The benzene is distilled off to obtain 5.5 g. of 1-{2-(3,4,5-trimethoxybenzoyl)-oxyethyl}-2-methyl-3-(10,11-dihydro-5H-dibenzo-[a,d]cycloheptenylidene)pyrrolidine as oily substance.

This product is converted, according to usual procedure, into the corresponding hydrochloride, and the hydrochloride is recrystallized from a chloroform-acetone mixture to obtain the crystalline hydrochloride salt of the present product, m.p. 193°–195°C.

| Elementary analysis: for $C_{32}H_{36}NO_5Cl$ | | | |
|---|---|---|---|
| | C | H | N |
| Calculated (%): | 69.87 | 6.60 | 2.55 |
| Found (%) : | 69.74 | 6.53 | 2.71 |

Example 4

To 0.2 g of α-methyl-3-(10,11-dihydro-5H-dibenzo[a,d]cycloheptene-5-ylidene)-2-methyl-1-pyrrolidineethanol to added 5 cc of acetyl chloride, and the resulting mixture is heated under reflux for 15 hours. From the reaction liquid, excess acetyl chloride is distilled off. The residue is dissolved in methanol, and the solution is treated with active carbon and then the methanol is distilled off to obtain 0.2 g of 1-(2-acetoxypropyl)-2-methyl-3-(10,11-dihydro-5H-dibenzo[a,d]cyclohepten-5-ylidene)-pyrrolidine as oily substance.

This product is converted, according to usual procedure, into the corresponding hydrochloride. The hydrochloride is then recrystallized from a chloroform-ether-acetone mixture to obtain the crystalline hydrochloride salt of the present product, m.p. 160°–164°C.

Elementary analysis: for $C_{25}H_{30}NO_2Cl$

|  | C | H | N |
|---|---|---|---|
| Calculated (%): | 72.89 | 7.34 | 3.40 |
| Found (%): | 72.61 | 7.50 | 3.31 |

Example 5

To a mixed solution of 0.5 g of 3-(10,11-dihydro-5H-dibenzo[a,d]cyclohepten-5-ylidene)-2-ethyl-1-pyrrolidineethanol and 0.46 g of triethylamine in 3 cc of dry chloroform are added with ice cooling a solution of 0.18 g of acetyl chloride in 2 cc of dry chloroform, and the resulting mixture is stirred at room temperature for 16 hours. The reaction liquid is pale orange in color at the beginning, but the color changes to reddish orange after completion of the reaction. Thereafter, the chloroform is distilled off, and the residue is charged with water and extracted with ether. The ethereal layer is thoroughly washed with water and then dried. The ether is removed by distillation from the ethereal layer to obtain a reddish orange oily product. The oily product is subjected to separation and purification by means of alumina (neutral) column chromatography (developing solvent: benzene) to obtain 0.2 g of 1-(2-acetoxyethyl)-2-ethyl-3-(10,11-dihydro-5H-dibenzo[a,d]cyclohepten-5-ylidene)pyrrolidine as a yellow oily product. A solution of 0.2 g of this oily product in ether is treated with maleic acid, according to usual procedure, to convert said oily product into the corresponding maleate. The maleate is recrystallized three times from acetone to obtain colorless powder of 1-(2-acetoxyethyl)-2-ethyl-3-(10,11-dihydro-5H-dibenzo[a,d]cyclohepten-5-ylidene)pyrrolidine maleate, m.p. 158°–159°C.

Example 6

To a mixed solution of 0.7 g of 3-(10,11-dihydro-5H-dibenzo[a,d]cyclohepten-5-ylidene)-2-isopropyl-1-pyrrolidineethanol and 0.815 g of triethylamine in 4 cc of dry chloroform is added with ice cooling a solution of 0.673 g of acetyl chloride in 2 cc of dry chloroform, and the mixture is stirred at room temperature for 6 hours. The reaction liquid is pale orange in color at the initiation of the reaction, but the color of said reaction liquid changes to reddish orange after completion of the reaction. Thereafter, the chloroform is distilled off, and the residue is charged with water and extracted with ether. The ethereal layer is thoroughly washed with water, then dried and the ether is distilled off to obtain a reddish brown oily product. This oily product is subjected to separation and purification by means of alumina (neutral) column chromatography (developing solvent: benzene) to obtain 0.5 g of 1-(2-acetoxyethyl)-2-isopropyl-3-(10,11-dihydro-5H-dibenzo[a,d]-cyclohepten-5-ylidene) pyrrolidine as a yellow oily product.

This yellow oily product is dissolved in ether, and the solution is treated with maleic acid, according to usual procedure, to convert said oily product into the corresponding maleate. The maleate is recrystallized three times from an acetone-ether mixture to obtain colorless needles of 1-(2-acetoxyethyl)-2-isopropyl-3-(10,11-dihydro-5H-dibenzo[a,d]cyclohepten-5-ylidene)pyrrolidine maleate.

Elementary analysis: for $C_{30}H_{35}O_6N$

|  | C | H | N |
|---|---|---|---|
| Calculated (%): | 71.26 | 6.98 | 2.77 |
| Found (%): | 71.31 | 6.89 | 2.65 |

Example 7

To a mixed solution of 0.5 g of 3-(3-chloro-10,11-dihydro-5H-dibenzo[a,d]cyclohepten-5-ylidene)-2-methyl-1-pyrrolidineethanol and 0.57 g of triethylamine in 3 cc of dry chloroform is added with ice cooling a solution of 0.33 g of acetyl chloride in 2 cc of dry chloroform, and the resulting mixture is stirred at room temperature for 6 hours. The reaction liquid is pale orange in color at the time of initiation of the reaction, but the color changes to reddish orange after completion of the reaction. Thereafter, the chloroform is distilled off, and the residue is charged with water and extracted with ether. The ethereal layer is thoroughly washed with water and then dried, and the ether is distilled off to obtain a reddish brown oily product. This oily product is subjected to separation and purification by means of alumina (neutral) column chromatography (developing solvent: benzene) to obtain 0.3 g of 1-(2-acetoxyethyl)-2-methyl-3-(3-chloro-10,11-dihydro-5H-dibenzo[a,d]cyclohepten-5-ylidene)pyrrolidine as a yellow oily product.

This oily product is dissolved in ether and treated with maleic acid, according to usual procedure, to convert said product into the corresponding maleate. The maleate is recrystallized twice from an acetone-ether mixture and then once from an anhydrous ethanol-anhydrous ether mixture to obtain colorless granules of 1-(2-acetoxyethyl)-2-methyl-3-(3-chloro-10,11-dihydro-5H-dibenzo[a,d]cyclohepten-5-ylidene)pyrrolidine maleate, m.p. 143°–144°C.

Elementary analysis: for $C_{28}H_{30}O_6NCl$

|  | C | H | N | Cl |
|---|---|---|---|---|
| Calculated (%): | 65.68 | 5.91 | 2.74 | 6.93 |
| Found (%): | 65.64 | 6.07 | 2.76 | 7.34 |

Example 8

To a mixed solution of 0.35 g of 3-(9H-xanthen-9-ylidene)-2-methyl-1-pyrrolidineethanol and 0.58 g of triethylamine in 3 cc of dry chloroform is dropped a solution of 0.38 g acetyl chloride in 2 cc dry chloroform, whereupon the reaction liquid is stirred at room temperature for 6 hours, whereby crystals precipitate. After completion of the reaction, the reaction liquid is charged with water and extracted with ether. The ethereal layer is washed with water and then dried, and the ether is distilled off to obtain an oil as residue. This oil is subjected to separation and purification by means of alumina chromatography (developing solvent: ethyl acetate) to obtain a yellow oil of 1-(2-acetoxyethyl)-2-methyl-3-(9H-xanthen-9-ylidene)-pyrrolidine.

This yellow oil is dissolved in ether and the solution is treated, according to usual procedure, with an ethanol solution of oxalic acid, to convert said oil into the corresponding oxalate. The oxalate is recrystallized from ethanol to obtain pale yellow granules of oxalate of the product, m.p. 201°C.

Elementary analysis: for $C_{24}H_{25}NO_{7.1/2}H_2O$

|  | C | H | N |
|---|---|---|---|
| Calculated (%): | 64.28 | 5.84 | 3.12 |
| Found (%): | 64.40 | 6.10 | 3.22 |

What we claim is:
1. A compound of the formula

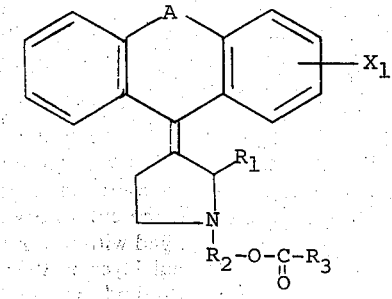

wherein A is ethylene or oxygen,
$R_1$ is hydrogen or lower alkyl,
$R_2$ is lower alkylene,
$R_3$ is lower alkyl, phenyl or phenyl substituted with 1-3 lower alkoxyl groups,
$X_1$ is hydrogen or chloro, and its pharmaceutically acceptable acid addition salts.

2. 1-(2-Acetoxyethyl)-2-methyl-3-(10,11-dihydro-5H-dibenzo[a,d]cyclohepten-5-ylidene)-pyrrolidine.

3. 1-(2-Isobutyryloxyethyl)-2-methyl-3-(10,11-dihydro-5H-dibenzo[a,d]cyclohepten-5-ylidene)pyrrolidine.

4. 1-{2-(3,4,5-trimethoxybenzoyl)oxyethyl}-2-methyl-3-(10,11-dihydro-5H-dibenzo[a,d]cyclohepten-5-ylidene)pyrrolidene.

5. 1-(2-Acetoxypropyl)-2-methyl-3-(10,11-dihydro-5H-dibenzo[a,d]cyclohepten-5-ylidene)-pyrrolidine.

6. 1-(2-Acetoxyethyl)-2-ethyl-3-(10,11-dihydro-5H-dibenzo[a,d]cyclohepten-5-ylidene)-pyrrolidine.

7. 1-(2-Acetoxyethyl)-2-isopropyl-3-(10,11-dihydro-5H-dibenzo[a,d]cyclohepten-5-ylidene)-pyrrolidine.

8. 1-(2-Acetoxyethyl)-2-methyl-3-(3-chloro-10,11-dihydro-5H-dibenzo[a,d]cyclohepten-5-ylidene)-pyrrolidine.

9. 1-(2-Acetoxyethyl)-2-methyl-3-(9H-xanthen-9-ylidene)pyrrolidine.

\* \* \* \* \*